May 23, 1967  R. O. RUPP  3,321,348
APPARATUS AND METHOD FOR DEPOSITING REINFORCEMENT
MATERIAL ON A CONTINUOUSLY MOVING WEB
Filed May 20, 1963  6 Sheets-Sheet 1

INVENTOR:
RICHARD O. RUPP
BY
ATT'YS

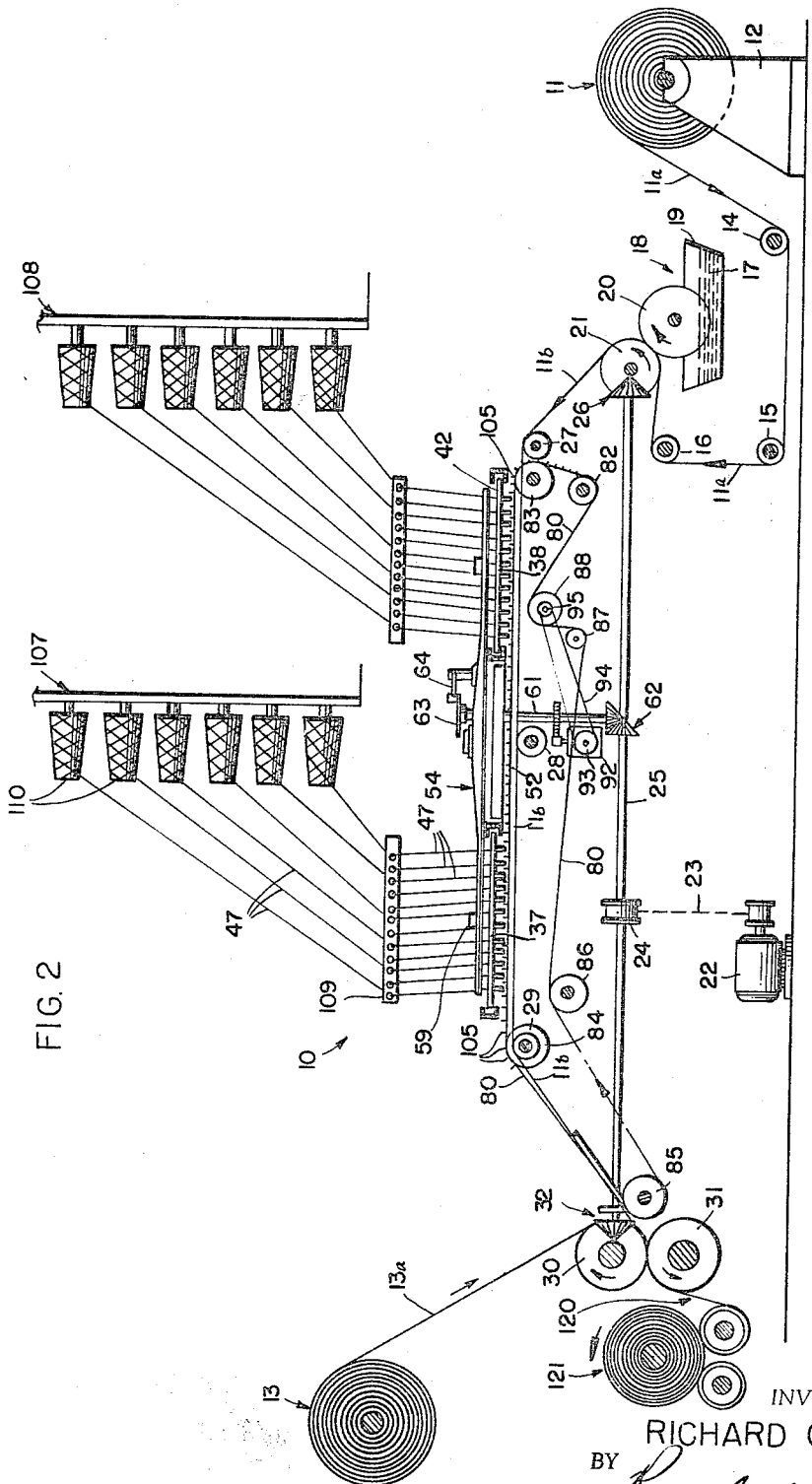

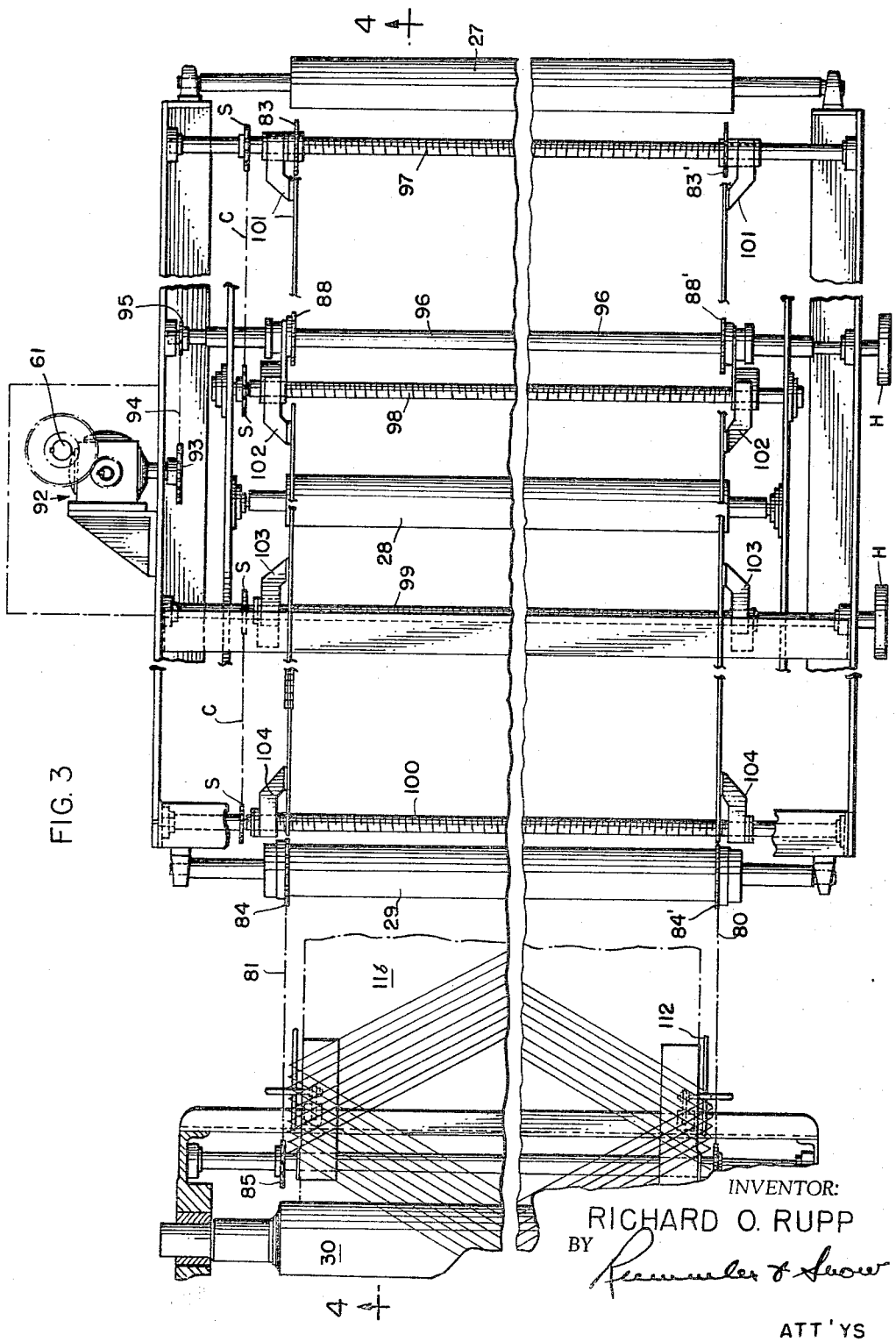

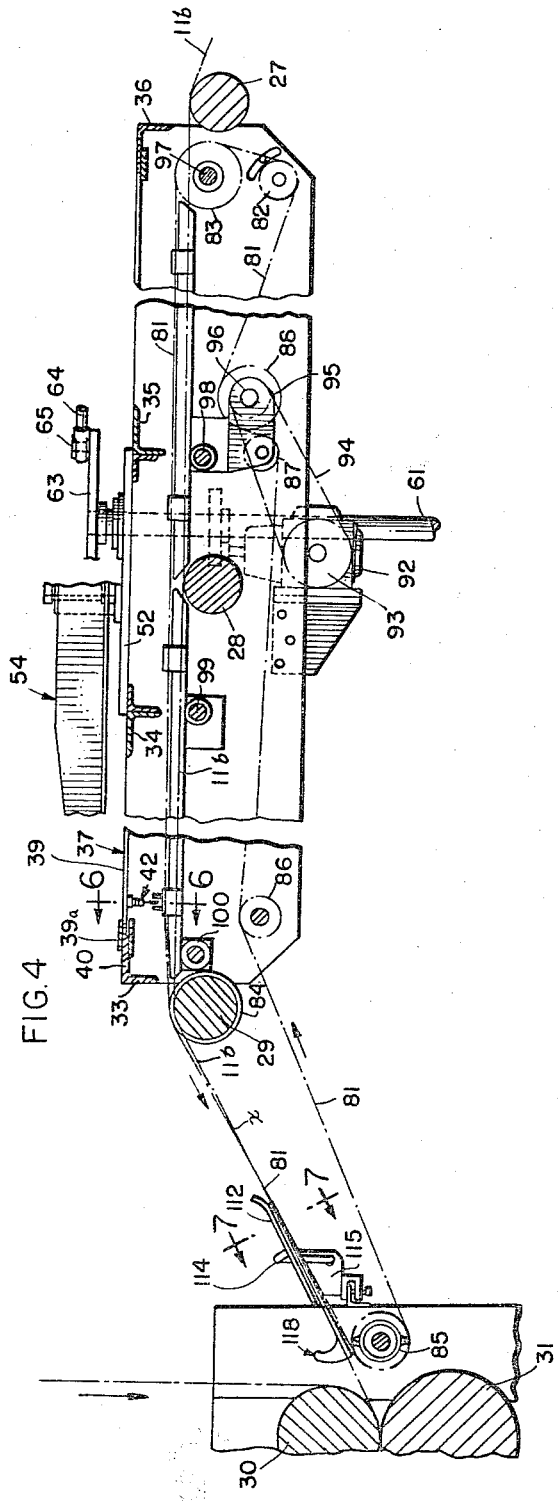

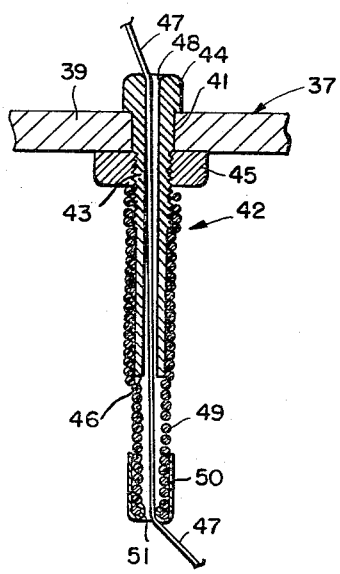
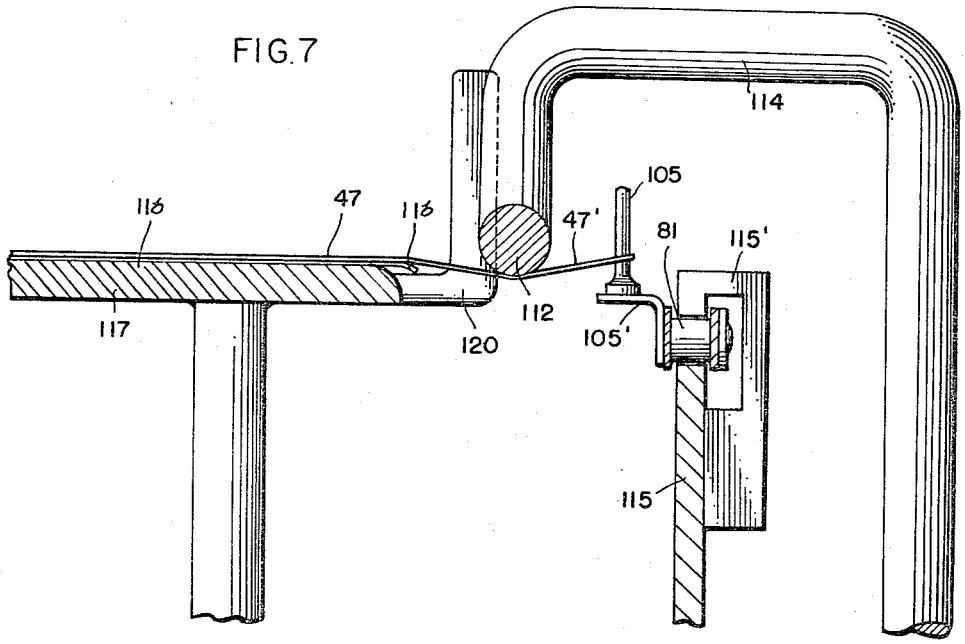

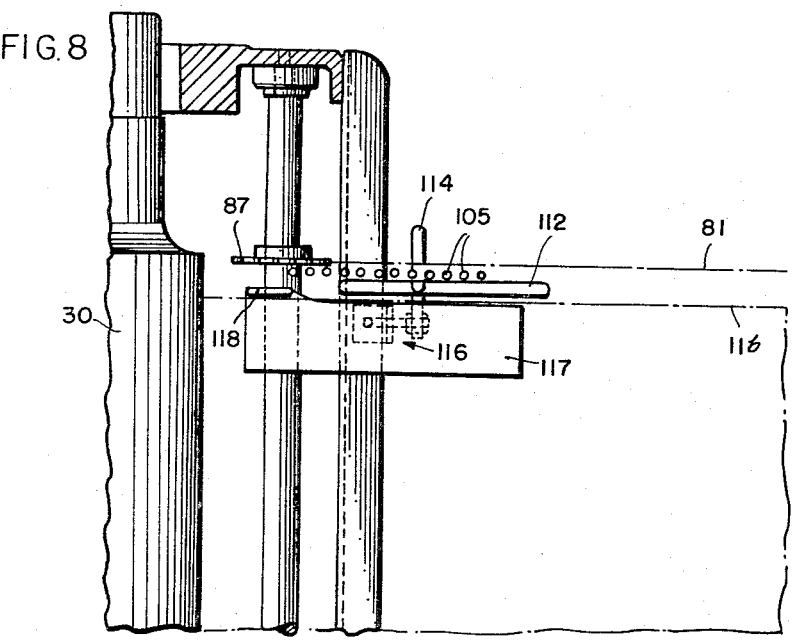
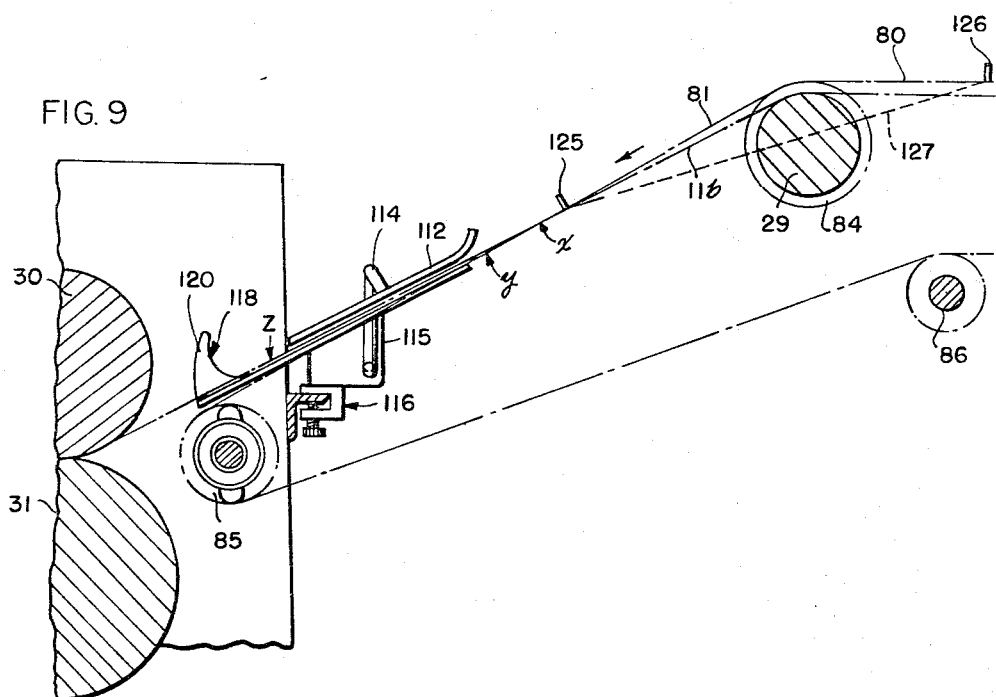

United States Patent Office 3,321,348
Patented May 23, 1967

3,321,348
APPARATUS AND METHOD FOR DEPOSITING REINFORCEMENT MATERIAL ON A CONTINUOUSLY MOVING WEB
Richard O. Rupp, Oak Lawn, Ill., assignor to The Cromwell Paper Company, Chicago, Ill., a corporation of Illinois
Filed May 20, 1963, Ser. No. 281,610
10 Claims. (Cl. 156—177)

This invention relates to apparatus and method for positioning reinforcement material uniformly on a continuous web. More in particular this invention relates to apparatus and method for depositing continuous strands of reinforcement material uniformly on a moving web and further reinforcing the web adjacent to the edges thereof. Still more in particular this invention relates to apparatus for depositing reinforcing strands continuously on a moving web which is readily adjustable for various widths of web.

In the manufacture of reinforced webs for numerous applications such as reinforced laminated sheet material the prior art methods and apparatus therefor possessed several drawbacks. First the machines were limited in that they were not adapted for use with webs of various widths. That is to say, the machines were generally designed for use with webs of one selected width. Possibly some machines could be altered for use with different web widths but only by major changes which are not only awkward but time consuming and hence expensive. The chief difficulty was the change required in that portion of the machine employed to deposit reinforcing strands. Second, the known machines made no simple provision for utilizing the turns of the strands for further reinforcement of portions of the web adjacent to the edges thereof. In other words the present invention contemplates an extremely simple arrangement for the providing of a strong selvage on the finished product. Third, the known machines do not deposit the strands uniformly on the web particularly in respect of the uniformity of tension of the strands when deposited on the web.

The present invention overcomes numerous difficulties including those difficulties above discussed. Accordingly prime objects of the present invention are to provide a machine or apparatus for uniformly depositing, continuously, reinforcing strands on a moving web wherein the apparatus is easily and quickly adjustable to accommodate webs of various widths; and to provide such a machine which, by one simple application, will apply reinforcing strands to a moving web in a pattern which will impart, to the web, resistance to tearing in the cross machine direction as well as in the machine direction.

Another important object of the present invention is to provide a new and novel method for depositing reinforcing strands continuously and uniformly on a moving web wherein the strands are deposited onto the web at substantially uniform tension.

Still another object of the present invention is to provide an apparatus and method for depositing reinforcing strands continuously on a moving web wherein all moving parts derive their power from a single source thus automatically synchronizing all movement.

A further important object of the present invention is to provide an apparatus and method for depositing reinforcing strands continuously on a moving web wherein the pattern formed by the strands deposited on the web is uniform throughout the length of the web.

These and other desirable and important objects of the invention will be more readily understood from the ensuing description of a specific embodiment thereof, the appended claims and the annexed drawings wherein:

FIG. 2 is a side elevation of the apparatus of FIGURE 1 in diagrammatic form illustrating its general arrangement with respect to the continuous web and the reinforcing strands;

FIG. 3 is a plan view, partly broken away, similar to FIGURE 1 except that the strand depositing mechanism is removed, illustrating construction details;

FIG. 4 is a side elevation of the apparatus of FIGURE 1, partly in section and partly broken away, taken on line 4—4 of FIGURE 3 illustrating construction details not apparent from the preceding figures;

FIG. 5 is a sectional view, partly broken away, taken on line 5—5 of FIGURE 1 illustrating the details for adjustably varying the moment arm of the pivotal drive connection to govern the distance of transverse movement of the two reinforcing strand carriers;

FIG. 6 is a sectional view, partly broken away, taken on line 6—6 of FIGURE 4 illustrating the construction of a flexible feed nozzle of a carrier for feeding and guiding one strand of a reinforcing material;

FIG. 7 is a sectional view, partly broken away, taken on line 7—7 of FIGURE 4 illustrating one of two stripper members for gently guiding and holding the strands in pattern formation onto the moving web;

Figure 1:
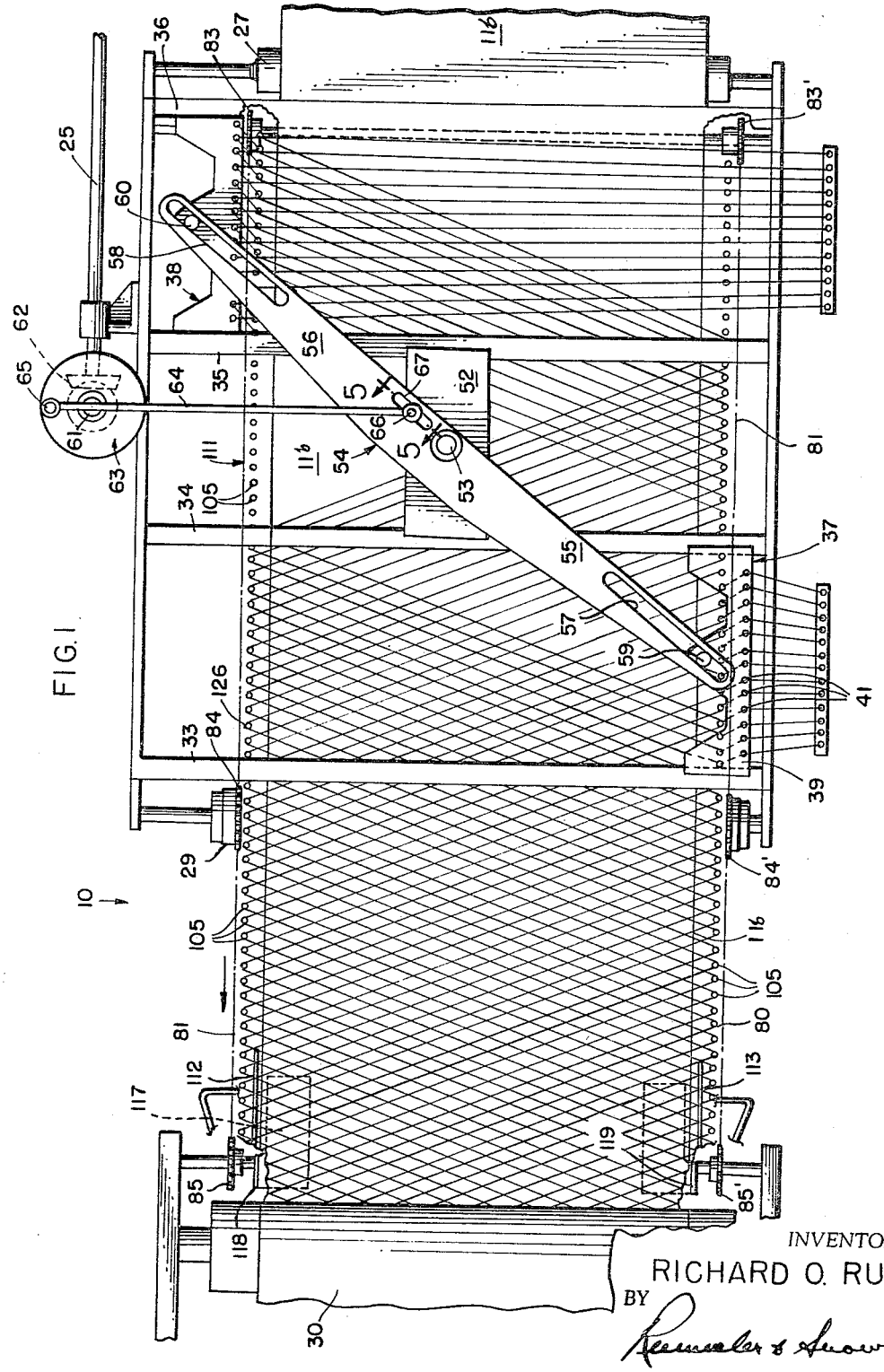
FIGURE 1 is a plan view, partly broken away, illustrating the apparatus of this invention and includes the web and strands positioned as in operation.

FIG. 8 is an enlarged portion of FIGURE 3, partly in section and partly broken away, illustrating the mounting and position of one stripper member in relation to one strand overlapping element for further reinforcing the edge portion of the moving web; and FIG. 9 is a side elevation of FIGURE 8, partly in section and partly broken away, illustrating the relation of a stripper member and its associated strand overlapping element with respect to the moving web and moving pattern of strands.

With continued reference to the drawings the numeral 10 in FIGURE 1 indicates generally the apparatus or machine according to this invention for manufacturing a two-ply web laminate having a uniformly disposed pattern of reinforcement strands therebetween. The roll of lower web material 11, such as paper, is rotatably supported on a stationary stand 12 as seen in FIGURE 2. The roll of upper web 13 is rotatably supported similarly in a suitable manner not shown. The web 11a emanating from roll 11 guided by rotatable cylinders 14, 15 and 16, moving in the direction of the arrows, shown in FIGURE 2, is coated on one side with a suitable adhesive 17 in a conventional manner such as by a coating device generally indicated at 18. The coating device 18 may conveniently be comprised of an open top receptacle 19 partly filled with a liquid adhesive having a suitable viscosity. A large rotatable horizontally disposed cylinder 20, conveniently supported, is positioned to immerse a peripheral portion thereof in the liquid adhesive 17 as shown. Positioned above the cylinder 20 is a smaller horizontally disposed rotatable cylinder 21 having its rotational axis parallel to the rotational axis of the cylinder 20. The supporting means for at least one of the cylinders 20 and 21 should be resilient so that the line of junction between the cylinders 20 and 21 is under opposing force thus forming a bite for the web 11a passing therebetween. The cylinder 21 is rotatably driven by the power source such as electric motor 22, belt 23, pulley 24 connected to the countershaft 25 and conventional bevel gear system indicated at 26. Thus as the web 11a passes through the bite of cylinders 20 and 21, in the direction indicated, the cylinder 20 deposits a thin uniform layer of adhesive 17 on one side of the web 11a to form a coated web 11b.

The coated web 11b next passes over transversely disposed rotatable cylinders 27, 28 and 29 as shown in FIG- URE 2. While only three web-supporting cylinders or rollers 27, 28 and 29, are shown it should be understood that additional intermediately disposed cylinders may be employed if desired. From the cylinder 21 the web 11b is pulled by the bite of rollers or cylinders 30 and 31. The cylinder 30 is driven from the countershaft 25 through bevel gear system indicated at 32. The cylinder 31 is resiliently mounted to exert pressure toward the cylinder 30 to form a bite to pull the web 11b therethrough much in the same manner as that described for cylinders 20 and 21. At this point it should be understood that the bevel gear system 32 should drive the cylinder 30 at a peripheral linear speed equal to that of the cylinder 21 in order to move the web 11b at a uniform speed across the cylinders 27, 28 and 29. From this it is apparent that the maximum width of the web 11b is limited only by the length of the various rotatable cylinders described.

As seen in FIGURES 1 and 4 there are four transversely disposed angle irons or tracks 33, 34, 35 and 36 secured in stationary relation with respect to the supporting structure of the apparatus 10. The tracks 33, 34, 35 and 36 are supported in parallel relation. Thus the tracks 33 and 34 form a support for a transversely slidable front carrier indicated at 37. Similarly the tracks 35 and 36 form a support for a transversely slidable rear carrier indicated at 38. Since the construction of carrier 37 is identical to that of carrier 38, only the carrier 37 will be described in detail and it may be assumed that the construction of carrier 38 is the same.

The carrier 37 comprises a plate assembly 39 having bifurcated end portions one of which is shown in FIGURE 4. It will be seen from FIGURE 4 that the bifurcated end portion 39a accommodates the horizontal leaf 40 of the track 33 in slidable relation. Thus it may be appreciated that the plate assembly 39 is guided and supported by the tracks 33 and 34 whereby the carrier 37 is slidable horizontally in a transverse direction with respect to the web 11b. Of course if desired rollers may be employed to support the carrier 37 on the tracks 33 and 34 to reduce friction in the transverse movement or reciprocation.

The plate 39 of the carrier 37 is provided with plurality of vertical bores 41 in longitudinal spaced relation as seen in FIGURE 1. Referring now to FIGURE 6 it will be seen that within each of the bores 41 is disposed a downwardly extending flexible feed nozzle indicated generally at 42. The nozzle 42 comprises a threaded shank 43 having a head 44. The shank 43 is rigidly secured to the plate 39 by a nut 45. The shank 43 is also provided with a bore 46 extending therethrough for accommodating a single reinforcing strand 47. In order to prevent rupture of the strand 47 being fed through the bore 46 the upper end thereof in the head 44 is rounded or chamfered at 48.

Secured to the shank 43 and extending therebelow is a tightly wound helical spring 49, screwed over the threads of the shank 43 and having a shoe 50 rigidly connected at the lower end thereof as seen in FIGURE 6. As shown, the lower end portion of the shoe 50 is spun, rolled or otherwise curled around the bottom loop of the spring 49 as at 51 to present a curved surface to the moving strand 47 so that it does not rupture or snag as it passes therethrough. Means will now be described for reciprocating the carriers 37 and 38 transversely in simple harmonic motion.

Referring to FIGURE 1, a support bracket 52 is secured rigidly to the tracks 34 and 35. Secured to the bracket 52 is an upwardly extending pivot shaft 53. Journalled for rotation about the pivot shaft 53 is a horizontally disposed rock arm 54 having opposed arms 55 and 56 substantially at 180° apart. The arms 55 and 56 of the rock arm 54 are of equal length and the pivot shaft 53 is positioned midway between the tracks 34 and 35 and in a vertical plane offset from the longitudinal centerline of the apparatus 10 and toward the crank 63, by a distance equal to the distance that the follower rods 59–60 are spaced from the feed nozzles on the respective carriers 37–38.

Each of the arms 55 and 56 is provided with an elongated slot 57 and 58 respectively. The slots 57 and 58 are preferably radial with respect to the pivot shaft 53. The plate 39 of the carrier 37, at the longitudinal center thereof, is provided with an upwardly extending follower rod 59 engaged in slidable relation with the slot 57. Similarly the carrier 38 is also provided with an upwardly extending follower rod 60 in slidable engagement with the slot 58. From this it will be apparent that if the rock arm 54 is rocked horizontally about its pivot shaft 53 the carriers 37 and 38 will reciprocate transversely in linear paths, the slots 57 and 58 providing accommodation for lost motion. Means will now be described for rocking the rock arm 54 horizontally in simple harmonic motion.

In FIGURE 2 it will be seen that there is a vertical shaft 61 driven by the countershaft 25 through a conventional bevel gear system indicated at 62. Secured to the upper end of the shaft 61 is a crankwheel 63. The linkage between the crankwheel 63 and the rock arm 54 comprises a connecting rod 64 pivotally connected on one end thereof to the crankwheel 63 at 65 and the other end thereof pivotally connected to the rock arm 54 at 66 as best shown in FIGURE 1. From this it can be seen that since the countershaft 25 is in drive relation with the crankwheel 63, the rock arm 54 reciprocates or swings back and forth in simple harmonic motion thus correspondingly moving the carriers 37 and 38 transversely back and forth. Now at this point it can be appreciated that the linear transverse distance that each of the carriers 37, 38 move is dependent upon the moment arm distance between the pivot pin 66 and shaft 53. An increase in this moment arm distance will shorten the transverse travel of the carriers 37, 38 and, conversely, if the moment arm distance is decreased, the transverse travel distance of the carriers 37, 38 correspondingly increases. Means will now be described for selectively adjusting the moment arm distance between pivot pin 66 and shaft 53.

Referring now to FIGURES 1 and 5 the arm 56 of the rock arm 54 is provided with a radially extending groove or slot 67 adapted to receive the pivot pin 66 slidably as shown. The position of the pivot pin 66 with respect to the slot 67 in the arm 56 is fixed during operation but may be moved adjustably along the slot 67 to vary the amplitude or throw of the rock arm 54. In FIGURE 5 it will be seen that the pivot pin 66 is in journalled relation with the connecting rod 64 employing a bearing metal sleeve 68 such as babbitt or bronze. The connecting rod 64 is secured from vertical movement on the pin 66 by means of a collar 69 and a conventional set screw 70 arrangement. The head 71 of pin 66 is in the form of a travelling nut internally threaded to fit radially extending screw 72. The screw 72 is mounted on the arm 56 of the rock arm 54 in the same vertical plane which passes through the axis of the slot 67 as best shown in FIGURE 5. The screw 72 is rotatably supported on one end portion by a bearing 73 secured to the arm 56 of rock arm 54. A set screw 74 is provided in the bearing 73 to secure releasably the screw 72 from rotation. The other end portion of the screw 72 is supported rotatably by another bearing 75 having a set screw 76 therein similar to that of bearing 73. One end portion of the screw 72 is provided with a collar 77 secured thereto such as by set screw 78. The other end of the screw 72 is provided with a hexagonal head 79 rigid therewith. Thus it can be seen that by loosening the set screws 74 and 76 in bearings 73 and 75 respectively, the screw 72 may be rotated conveniently as by applying a wrench to the head 79 thereof. Rotation of the screw 72 moves the pin 66 along the slot 67 in a radial direction with respect to the pivot axis of the rock arm 54. Tightening of the set screws 74 and 76 secures the screw 72 from further rotation thereby securing fixedly the pin 66 with respect to the rock arm 54.

From the foregoing it can be seen that the length of the moment arm between the axis of pin 66 and the axis of pivot 53 can adjustably be lengthened or shortened as desired. Since the length of the moment arm governs the lineal distance of transverse travel of the carriers 37 and 38 it can be seen that by merely adjusting the screw 72 the movement of the carriers 37 and 38 can be set to accommodate any desired width of web 11b. Means will now be described for accommodating, carrying and depositing the strands 47 in pattern form onto the web 11b.

Referring to FIGURES 1, 2 and 4, a pair of parallel moving chains 80, 81 of the sprocket type are provided to extend longitudinally of the machine, one on each side thereof. From FIGURE 4 it will be seen that the chain 81 is carried by sprockets 82, 83, 84, 85, 86, 87 and 88. The sprocket 88 mounted on shaft 96 is driven by the countershaft 25 (see FIGURE 2), conventional gear transmission system indicated generally at 92, sprocket 93, sprocket chain 94 and sprocket 95. Referring to FIGURE 3 the sprockets 88 and 95 are rigidly mounted on shaft 96 which shaft forms the drive for both sprocket chains 80 and 81 as shown, the chain 80 being driven by the sprocket 88'. Now the drive sprockets 88 and 88' are keyed to the shaft 96 and may be moved axially on shaft 96 depending upon the width of the web 11b. During operation the sprockets 88 and 88' are in a fixed position with respect to shaft 96. The adjustment for positioning the sprockets 88 and 88' on shaft 96 is by rotating a double or right and left threaded shaft 98 which moves the sprockets 88 and 88' in opposite directions simultaneously by means of bracket members threaded on the shaft 98. Likewise sprockets 83, 83' on shaft 97 are adjustable transversely by rotation of double threaded shaft 97, the sprockets 83 and 83' being mounted for free rotation relative to the shaft 97. Similarly the remaining sprockets carrying chains 80, 81 can be adjusted for transverse distance between them to accommodate a web of the desired width.

A simple arrangement for adjusting the sprockets and guide rails for the chains 80 and 81, to move them in and out relative to the centerline of the machine, is shown in FIGURE 3 wherein each of the shafts 97, 98, 99 and 100 is provided with a sprocket S, fast thereon, on the drive or "power side" of the machine, and the pairs of these sprockets are connected together by chains C whereby rotation of one sprocket will cause rotation of the other. Also one shaft of each pair is extended beyond the frame on the opposite side of the machine and provided with a hand wheel H for manual turning. Thus shafts 97–98 are connected as one pair, shafts 99–100 are connected as the other pair, and shafts 98–99 are provided with the hand wheels.

The sprockets 85–85' at the finishing end of the machine are splined on their supporting shaft and held in position by suitable set screws. Thus these sprockets are separately and individually adjusted for web width. Likewise sprockets 82, 86 and 87 are individually adjusted, although it will be understood that they too may be arranged for adjustment by right and left hand threaded shafts.

From this it can be seen that the path of travel of the sprocket chains 80, 81 may be shifted transversely as the selected width of the web 11b dictates by merely rotating the adjustment shafts 98 and 99 by the hand wheels H and resetting the sprockets 82, 85, 86 and 87.

In FIGURE 3 it will be seen that a transversely adjustable stationary chain guide 101, mounted on adjustment shaft 97 at each side of the machine, is provided to support the horizontal run of the chains 81 and 80 between sprockets 83–83' and 84–84'. Similar guides 102, 103 and 104 are supported by shafts 98, 99 and 100 respectively. These guides provide support rails on which the chains ride and thus prevent sagging of the chains 80 and 81 so that they move parallel and horizontally slightly above the web 11b between cylinders 27 and 29 as seen in FIGURE 4. This manner of supporting the chains is also illustrated at 115 in FIGURE 7 and, as before mentioned, lateral adjustment of these chain guides is automatically effected by adjustment of the chain sprockets in the shafts 97, 98, 99 and 100.

Each of the chains 80 and 81 is provided with vertically extending pins 105 equidistantly spaced as indicated in FIGURES 1 and 2. Thus as the chains 80 and 81 move in the same direction as the web 11b the pins 105 extend upwardly, as seen best in FIGURE 2, and since the lineal speed of the chains 80 and 81 is the same as the lineal speed of the web 11b, the pins 105 move with the web to provide a marginal picket system at each side of the web.

As shown in FIGURE 7 the pins 105 are disposed laterally inward of the respective chain and are mounted on bracket elements 105' which in turn are attached to the sides of the chain links. This permits of additional chain guide means for confining the chain in all directions as will be hereinafter described. A discussion of the movement of carriers 37, 38, chains 80, 81 and strands 47 in relation to each other will now be made.

Referring to FIGURE 2 it will be seen that above each of the carriers 37 and 38 are respective creels 107 and 108. In stationary relation above the carrier 37 is a comb 109 which may consist of a bar having a plurality of apertures for conducting or guiding strands 47 therethrough. Each of the reels 110 is a source of the strands 47. At this point it should be understood that the term "strand" means single filaments, twisted filaments or multi-strand material. The base material from which the strands 47 are made may be of any selection such as cotton, wool, glass fibers, plastic yarn or cord, or even wire. The strands 47 emanate from the reels 110 on creel 107, through the apertures in the comb 109, one strand from one reel passing through one aperture of the comb. Each strand 47 emanating from an aperture in the comb 109 is then led into and through a flexible feeder nozzle 42 on the carrier 37. Now the timing of the swing of the rock arm 54 is such that each feeder nozzle 42 passes between two adjacent pins 105 shortly before the carrier reaches the limit of its transverse stroke. Now by the time the carrier starts its return stroke the chains 80 and 81 will have moved a distance equal to about one-half the lineal distance between two adjacent pins 105. By the time that the carrier 37 moves on its return stroke such that the feeder nozzle 42 reaches the line of movement of the prongs 105, the chains 80 and 81 will have moved a distance equal to that between two adjacent pins 105. Thus the timing is such that the feeder nozzle 42 passes across the line of travel of the chains 80 and 81 between two adjacent pins 105. From this it will be apparent that a reinforcing strand 47 emanating from a feeder nozzle 42 on the carrier 37 is looped around a pin 105 on each reversal of stroke direction of the carrier 37 as shown in FIGURE 1. Since a plurality of strands 47 from creel 110 pass through corresponding apertures in the comb 109 and thence through corresponding feeder nozzles 42 the carrier 37 first loops strands 47 on group of pins 105 on chain 80 and then proceeds to loop strands 47 around a group of pins 105 on chain 81.

Now as indicated at 111 in FIGURE 1 the carrier 37 has skipped a group of pins 105 on chain 81. However the carrier 38 is 180° out-of-phase with respect to the carrier 37 and since carrier 38 is supplied with strands in the same manner as carrier 107 it will function to distribute the strands over the web in the same way. Thus carrier 38 loops strands 47 around the empty pins 105 and as the chains 80, 81 carry the looped strands 47 toward the cylinder 29 a criss-cross or diamond shape pattern is formed as shown in FIGURE 1. However, when the looped strands 47 reach the position of cylinder 29 (FIGURE 1) the strands have not yet contacted the adhesive coated upper side of the web 11b because they are held in an elevated position by the chains 80 and 81. The deposition of the strands 47 in pattern form onto the web 11b will now be explained.

Referring now to FIGURES 4 and 9 it will be seen that as web 11b moves angularly in a downward direction from the horizontal plane, the chains 80 and 81 also move angularly in a downward direction but at a greater slope. Since the chains 80 and 81 are positioned outwardly from the respective edges of the web 11b as shown in FIGURES 1 and 8 it is apparent from FIGURE 9 that the chains 80 and 81 move from a position above the web 11b to a position below the web, crossing the plane of the web at a transverse line designated as X. However the pins 105 carrying the strands 47 will not completely deposit the strands on the upper adhesive coated web 11b until the transverse line designated Y is reached. However the major portion of the strands 47 are embedded in the adhesive as the web passes over the roller 29. This is due to the fact that although the pins 105 carrying the strands 47 are some distance above the chains 80 and 81 as is evident from FIGURE 7, the diagonally transverse direction of the strands between chains 80 and 81 brings them in firm contact with the web 11b. This is indicated in FIGURE 9 wherein a forward pin 125 on chain 81 is shown and an opposite pin on chain 80, for carrying the same strand, is shown at 126, at a point rearward of the roller 29, and the dotted line 127 indicates the line of tension in the strand extending between the two pins. Since the roller 29 intervenes, the strand is pulled onto the web 11b by the downward travel of the chain 81 after it passes roller 29. At the line Y the pattern of strands engage strippers 112 and 113 (FIGURES 1, 7 and 9). The stripper 112 comprises a stationary mounted arm 114 adjustably positioned transversely by a conventional bracket and screw arrangement indicated generally at 116 in FIGURE 9. The stripper 113 adjacent the chain 80 is constructed similar to the stripper 112.

Disposed beneath the web 11b adjacent the strippers 112 and 113 is a supporting plate 117 for the web 11b. Now from FIGURE 7 it will be seen that as the chains 80 and 81 proceed downwardly the strippers 112 and 113 press the remaining unadhered portion of the strands 47 onto the web 11b before the pins 105 have progressed far enough downwardly to be withdrawn from engagement with the strands 47.

During the downward movement of the chains 80 and 81 guides 115' are provided at intervals on the chain rails to make certain that the chains follow the proper path along the rails and do not twist or lift under the lateral tension of the strands 47, thus ensuring a steady pull and downward movement of the strands so that the withdrawal of the pins 105 from the loops 47' of the strands 47 is steady but certain. These guides 115' are in the form of inverted J-shaped brackets secured to the chain guide rails and overhanging the chain so as to hold it against the respective rail and it will be understood that at least one such bracket will be mounted on each of the guide rails 101, 102, 103 and 104.

By the time the web 11b proceeds to the transverse line designated at Z in FIGURE 9 the pins 105 will have been completely disengaged from the loops 47' and the strands 47 in pattern form are deposited firmly on the web 11b. However it will be apparent from FIGURES 1 and 7 that the loops of strands 47' still project outwardly from the edges of the web 11b. Therefore loop aligning members 118 and 119 are provided, one on each side of the web 11b. Each aligning member is stationary and comprises a curved vertically extending element 120 which conveniently may form a part of the plate 117 as seen in FIGURES 4 and 9. The curved element 120 is positioned to just clear the edge of the web and is such that as the web 11b moves past it gathers the loose loops of projecting strands 47' and turns them rearwardly along the upper margin of the web 11b thus providing additional reinforcement as a selvage.

Referring now to FIGURE 2 it will be seen that when the web 11b, having the diamond shaped pattern of strands 47 deposited thereon, feeds through the bite of the cylinders 30 and 31 simultaneously with the upper web 13a from the roll 13, thus forming the finished product 120 consisting of a laminate of the webs 11b and 13a having a uniform pattern of reinforcement strands 47 therebetween and sealed together by the pressure of the cylinders 30 and 31 and the adhesive 17. This finished product is then gathered on a roll 121 for subsequent use.

In the event that the sprocket chains 80 and 81 inadvertently get out-of-phase with the carriers 37 and 38 whereby the feeder nozzles 42 strike or impinge upon the pins 105 no damage is done to the apparatus for the reason that spring portion 49 of the feeder nozzles 42 (see FIGURE 6) will yield laterally sufficiently to pass the pins 105. Thus the spring portion 49 not only provides a guide tube of sufficient stiffness to guide the strand without yielding under the normal tension imposed on the strands 47, but also functions as a safety means to prevent damage to guide system and the chain pins 105.

The main advantages of this invention reside in the versatility and ease of adjustment of the machine to precisely accommodate webs of substantially any commercially produced widths; in the simplicity and accuracy of operation of the mechanism for forming and depositing a uniform pattern of woven reinforcing strands; in the improved manner of laying the woven reinforcement pattern onto the adhesive coated surface of the web without slip or drag; and in the simple arrangement for treating the end loops of the woven strands so that they serve as selvage reinforcement instead of being cut away or otherwise removed.

Although but one specific embodiment of the invention has been herein shown and described it can now be seen that the objects of the invention have been fully achieved and it must be understood that changes and modifications of the construction shown may be made which do not depart from the spirit of the invention nor from the scope thereof as defined in the appended claims.

What is claimed is:
1. A machine for making a reinforced fabric comprising
    (a) means for supporting and continuously advancing a continuous web of sheet material along a predetermined horizontal path,
    (b) first and second carriers reciprocable transversely of said web and spaced apart longitudinally thereof, each for traversing a plurality of continuous length reinforcing strands back and forth across said web during the travel thereof,
        (1) said carriers being mounted to reciprocate in a plane parallel with the plane of said web,
    (c) a rock arm pivoted midway between its ends for oscillation about a fixed axis disposed normal to the plane of said web and located midway between said carriers,
        (1) each end of said rock arm having driving connection with a respective one of said carriers for reciprocating the carriers in 180° out-of-phase relation with each other, and
    (d) drive means for oscillating said rock arm in timed relation with the travel of said web.

2. A machine for making a reinforced fabric as defined by claim 1 wherein the last named means comprises a rotating crank and a connecting rod extending from the crank to a pivoted connection on said rock arm eccentric with the axis of oscillation thereof, and wherein said pivoted connection of the connecting rod and rock arm is adjustable toward and away from said axis for varying the reciprocation stroke of said carriers.

3. A machine for making a reinforced fabric as defined by claim 1 wherein an endless belt is disposed parallel with and along each side of said web, said belts running continuously in the same direction as said web and each carrying a plurality of uniformly spaced pins projecting above the plane of said web and about which the said strands are looped individually at each reversal of the traverse of said strands, means located beyond said carriers in the direction of web travel are provided to lead said belts along parallel paths passing through the plane of said web to transfer said strands from said pins onto the web, and a stripper member is mounted adjacent each edge of the web for engaging and pressing the reinforcing strands against the surface of said web while said belts pass through the plane thereof.

4. A machine for making a reinforced fabric as defined by claim 1 wherein an endless belt is disposed parallel with and along each side of said web, said belts running continuously in the same direction as said web and each carrying a plurality of uniformly spaced pins projecting above the plane of said web and about which said strands are looped individually at each reversal of the traverse of said strands, means located beyond said carriers in the direction of web travel are provided to lead said belts along parallel paths passing through the plane of said web to transfer said strands from said pins onto the web, and a loop aligning member is mounted adjacent each edge of the web for engaging the loops of said strands as they are transferred from said pins and turning said loops inwardly along the margin of the web.

5. A machine for making a reinforced fabric as defined by claim 1 wherein an endless belt is disposed parallel with and along each side of said web, said belts running continuously in the same direction as said web and each carrying a plurality of uniformly spaced pins projecting above and in a plane normal to the plane of said web and about which said strands are looped individually at each reversal of the traverse of said strands, means located beyond said carriers in the direction of web travel are provided to lead said belts along parallel paths passing through the plane of said web to transfer said strands from said pins onto the web, a stripper member is mounted adjacent each edge of the web for engaging and pressing the reinforcing strands against the surface of said web while said belts pass through the plane thereof, and a loop aligning member is mounted adjacent each end of the web for engaging the loops of said strands as they are transferred from said pins and turning said loops inwardly along the margin of the web.

6. A power driven apparatus for making continuously a laminated product of selectively variable width having a uniform pattern of reinforcing strands comprising, in combination,
   (a) a longitudinally continuous moving lower web having the upper side thereof adhesive coated,
   (b) a first means disposed above said web and extending along each edge thereof for receiving and continuously moving with the web a uniform pattern of reinforcing strands in supported relation,
   (c) a reinforcing strand pattern generating mechanism positioned to deposit a plurality of reinforcing strands in uniform pattern relation onto said first means,
   (d) a second means for transferring and depositing said pattern of reinforcing strands from the first named means onto the adhesive coated upper side of said web after the said pattern has been produced by said pattern generating mechanism, and
   (e) an overlapping member adjustably disposed adjacent each edge of said lower web, and positioned for gathering transversely projecting portions of said pattern of reinforcing strands as they are released from the first means and aligning the same adjacent the edges of said lower web forming a reinforced selvage on said product.

7. A power driven apparatus for making continuously a laminated product according to claim 6 wherein said second means includes a stripper member adjustably disposed adjacent each edge of said lower web and positioned for engaging and pressing said pattern of reinforcing strands onto the upper side of said lower web.

8. An apparatus for uniformly depositing a plurality of reinforcing strands continuously onto the surface of an adhesive coated web moving continuously in a longitudinal direction comprising, in combination,
   (a) a plurality of rotatable cylinders horizontally supporting said continuously moving web,
   (b) a continuously moving first sprocket chain having a portion thereof disposed above and outwardly with respect to one edge of said web,
   (c) a continuously moving second sprocket chain having a portion thereof disposed above and outwardly with respect to the other edge of said web,
   (d) power means for moving said web and said portions of said chains longitudinally in the same direction and at the same linear speed,
   (e) a plurality of pins disposed on said chains in longitudinal spaced relation, said pins of each chain being positioned in a vertical plane,
   (f) first and second carriers positioned above said chains,
   (g) tracks disposed above said chains for supporting said carriers for horizontal transverse movement relative to said web,
   (h) a horizontally swingable rock arm disposed above said carriers and connected to said carriers and said power means in drive relation for reciprocating said carriers, one of said carriers moving in 180° out-of-phase relation with respect to the other said carrier,
   (i) a plurality of feeder tubes mounted on each of said carriers in spaced relation longitudinally of said web,
   (j) means for feeding a plurality of reinforcing strands through said feeder tubes, each of said tubes passing between one pair of pins on one of said chains during movement of the respective carrier in one direction and looping the respective strand around the trailing pin upon reversal of the carrier movement,
   (k) a second portion of each of said chains moving across the plane of said web for progressively withdrawing said pins from said strands,
   (l) a stripper member disposed adjacent each edge of said web and positioned to engage and press said strands onto said web as said pins withdraw from the looped strands, and
   (m) an overlapping member disposed adjacent each edge of said web and said stripper members and positioned to gather looped strands extending outwardly of said web and align the same onto the margin of said web whereby a reinforced web having a plurality of reinforcing strands in criss-cross pattern relation is produced.

9. The method of applying a pattern of reinforcing strands onto a continuous web of sheet material coated with adhesive substance which comprises the steps of traversing a plurality of continuous length reinforcing strands back and forth across the web during travel thereof, said strands reversing after passing beyond the edges of said web to form a continuous sinuous pattern of the strands running lengthwise of the web in a plane above and substantially parallel with the web, lowering said strand pattern onto the adhesive coated surface of the web, and then turning the strand loops rearwardly relative to the web travel and along the edges of the web to provide a reinforced selvage thereon.

10. The method of applying a pattern of reinforcing strands onto a continuous web of sheet material coated with adhesive substance which comprises the steps of traversing a plurality of continuous length reinforcing strands back and forth across the web during travel thereof, said strands reversing after passing beyond the edges of said web and looping about respective pins traveling with the web in laterally spaced relation with each edge thereof to form a continuous sinuous pattern of the strands running lengthwise of the web in a plane above and substantially parallel with the web, lowering said pins in the direction normal to the web surface to embed the strand pattern into the adhesive coating on the surface of the web and withdrawing the pins from the strand loops, and then turning the strand loops rearwardly relative to the web travel and along the edges of the web to provide a reinforced selvage thereon.

References Cited by the Examiner

FOREIGN PATENTS 219,619    1/1959    Australia.
 25,158      1914    Great Britain.

EARL M. BERGERT, Primary Examiner.

J. P. MELOCHE, Assistant Examiner.